United States Patent [19]

Stump

[11] Patent Number: 5,052,527
[45] Date of Patent: Oct. 1, 1991

[54] BRAKE SLACK ADJUSTER MECHANISM

[76] Inventor: Thomas D. Stump, Rte. 1, Box 16D, Flatwoods, W. Va. 26621

[21] Appl. No.: 527,951

[22] Filed: May 24, 1990

[51] Int. Cl.⁵ .............................................. F16D 65/48
[52] U.S. Cl. ............................. 188/79.55; 188/196 M; 411/374; 411/910
[58] Field of Search ............... 188/79.55, 79.57, 79.58, 188/79.51, 196 M; 411/105, 108, 372, 373, 374, 429, 910

[56] References Cited

U.S. PATENT DOCUMENTS

| | | | |
|---|---|---|---|
| 533,338 | 1/1895 | Bagley | 411/429 X |
| 4,499,978 | 2/1985 | Norcross | 188/79.55 |
| 4,809,820 | 3/1989 | Smith | 188/79.55 |

FOREIGN PATENT DOCUMENTS

| | | | |
|---|---|---|---|
| 3741519 | 5/1989 | Fed. Rep. of Germany | 188/79.57 |
| 790655 | 2/1958 | United Kingdom | 411/429 |
| 982457 | 2/1965 | United Kingdom | 188/79.55 |

*Primary Examiner*—George E. A. Halvosa
*Attorney, Agent, or Firm*—Charles F. Duffield

[57] ABSTRACT

Improvements are disclosed to conventional brake slack adjuster mechanisms of the type which are employed upon heavy equipment such as dump trucks and the like which mechanisms are anchored to the axle of the truck and utilize a worm drive and spline arrangement within an adjuster housing to drive a spline shaft interconnected to the brake assembly to adjust the brakes. The worm drive is driven by a worm drive adjusting bolt which has an adjusting bolt head which interreacts with a spring loaded adjusting bolt head socket lock which may be forced out of disenagagement with the adjusting bolt head to permit adjusting of the brakes by the worm-spline drive arrangement and which adjusting bolt head socket lock upon release engages the adjusting bolt head to lock the adjusting bolt head against misadjustment. The improvements include a retrofit adjusting nut larger than the adjusting bolt head secured to the adjusting bolt head and which cooperates with a lock housing which includes a lock housing socket fitting over the retrofit adjusting bolt nut and a flange plate secured to the open end of the lock housing socket all of which works in conjuction with a device to secure the lock housing and its associated lock housing socket and flange plate in sealed relationship with the adjuster housing.

4 Claims, 1 Drawing Sheet

BRAKE SLACK ADJUSTER MECHANISM

BACKGROUND OF INVENTION

The present invention relates to the art of brake adjusting mechanism and, more particularly, to those brake slack adjusting mechanisms commonly used on large vehicles such as dump trucks and the like and where such mechanisms are externally mounted to the axle of the truck and operate shafts to take up the slack in the brake mechanisms.

A brake slack adjusting mechanism commonly in use today and to which the improvements of the present invention apply is shown in FIG. 1 of the drawings. The conventional brake slack adjuster 10 includes a worm drive and spline drive adjuster housing 11 which terminates in an anchor arm 12. In conventional use, the anchor arm 12 is secured to the axle of the vehicle of the related components to secure the brake slack adjuster 10 in place.

The adjuster housing 11 includes therein a worm drive (not shown) which drives a brake adjuster spline 13. The brake adjuster spline 13, in turn, drives a spline shaft (not shown) which is interconnected to the vehicle braking mechanism to expand or adjust the brakes as the adjuster spline 13 is rotated.

The brake slack adjuster 10 includes, extending from the worm drive (not shown) within the adjuster housing 11, a worm drive adjusting bolt 14. The worm drive adjusting bolt 14 terminates in a six sided adjusting bolt head 15. Rotation of the adjusting bolt head 15 will drive the worm drive (not shown) which, in turn, drives the brake adjuster spline 13 to thus apply a torque to the spline shaft (not shown) to ultimately adjust the brakes.

The conventional brake slack adjuster 10 has, extending from the adjuster housing 11 and in axial alignment with the worm drive adjusting bolt 14, a socket lock boss 16. Journaled within and extending from the socket lock boss 16 is a spring loaded adjusting bolt head socket lock 17. The adjusting bolt head socket lock 17 includes, on the outer circumference thereof, a key 18 which cooperates with a slot 19 in the socket lock boss 16 to prevent the adjusting bolt head socket lock 17 from turning.

The spring loaded adjusting bolt head socket lock 17 operates in a manner such that, when a socket wrench or other suitable wrench is placed upon the adjusting bolt head 15 and pressed against the spring pressure of the spring loaded adjusting bolt head socket lock 17, the adjusting bolt head socket lock 17 will move inwardly into the socket lock boss 16 and thus move free and clear from its locking relationship with the adjusting bolt head 15 thus permitting the adjusting bolt head 15 to be rotated to adjust the slack of the brakes. Upon release of the pressure upon the spring loaded adjusting bolt head socket lock 17, the bolt head socket lock 17 will move outwardly and into engagement with the adjusting bolt head 15 whereupon the internal socket 20 of the adjusting bolt head socket lock 17, which is of configuration complementary to that of the adjusting bolt head 15, will move into locking engagement with the adjusting bolt head 15 and thus prevent the adjusting bolt head 15 from turning to prevent misadjustment of the vehicle brakes.

The conventional brake slack adjusting mechanisms as above described perform reasonably satisfactory in their function when new. However, the operation of the vehicle is constantly applying a torque back through the spline shaft (not shown) to the brake adjuster spline 13 and through the worm drive (not shown) to cause constant flexing or torquing of the adjusting bolt head 15 against the adjusting bolt head socket lock 17. These vehicles such as dump trucks and the like operate in extremely corrosive atmospheres and abrasive atmospheres due to the dust, dirt and other wear inducing road particles. As a result, the constant flexing or torquing of the adjusting bolt head 15 within the bolt head socket lock 17, working in conjunction with the corrosive and abrasive atmosphere in which these vehicles operate, results in very quick and premature destruction of the surfaces of the adjusting bolt head 15 and adjusting bolt head socket lock 17 with the consequent failure of the mechanism in that the adjusting bolt head 15 will turn within the bolt head socket lock 17 thus permitting the adjustment of the braking mechanism to be lost.

The failure of the brake slack adjuster, by reason of the slippage between the adjusting bolt head 15 and bolt head socket lock 17, results in constant need to readjust the mechanism to properly adjust the brakes which is both costly from the point of view of lost manpower and vehicle usage. More importantly, the failure of the brake slack adjuster by these reasons sets forth a dangerous situation in the possibility of brake failure on the vehicle.

SUMMARY OF INVENTION

The improvements to brake slack adjusting mechanisms of the present invention overcome the foregoing deficiencies of the conventional brake slack adjusting mechanism in the areas of the undue wear of the adjusting bolt head and spring loaded adjusting bolt head socket lock by the provision of an enlarged retrofit adjusting nut which is welded or otherwise secured to the adjusting bolt head. The retrofit adjusting nut is larger than the adjusting bolt head of the worm drive adjusting bolt but of less dimension than the circumference of the socket lock boss.

A lock housing is provided which is closed upon its first end and open upon its second end and the internal configuration of which forms a lock housing socket complementary with the configuration of the retrofit adjusting nut. The lock housing socket is open at its second end and is positioned such that it fits over the retrofit adjusting nut with its second end in sealing engagement with the socket lock boss.

A flange plate is attached to the lock housing at the second end thereof and works in conjunction with securing means such as threaded studs welded to the adjuster housing which pass through apertures in the flange plate and secure the flange plate and its associated lock housing and lock housing socket in place by means of threaded fasteners on the opposite ends of the studs.

Weather sealing means may be provided between the lock housing socket and the socket lock boss. In this manner, the enlarged retrofit adjusting nut, working in conjunction with the lock housing socket, provides increased torsional resistance and the sealing relationship of the lock housing with the socket lock boss provides protection against the corrosive and abrasive atmosphere and environment within which the vehicle operates.

DETAILED DESCRIPTION OF INVENTION

Figure 1:
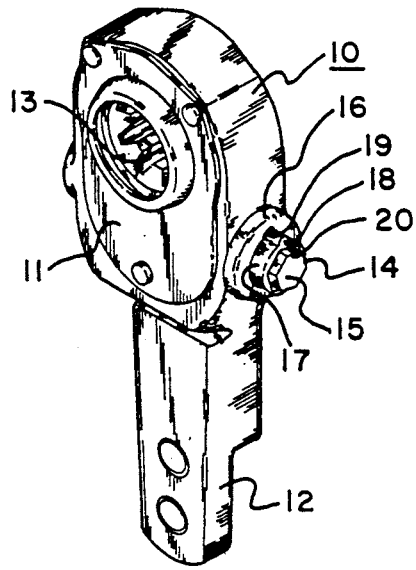
FIG. 1 is a perspective view of a conventional brake slack adjuster to which the improvements of the present invention apply.
Figure 4:
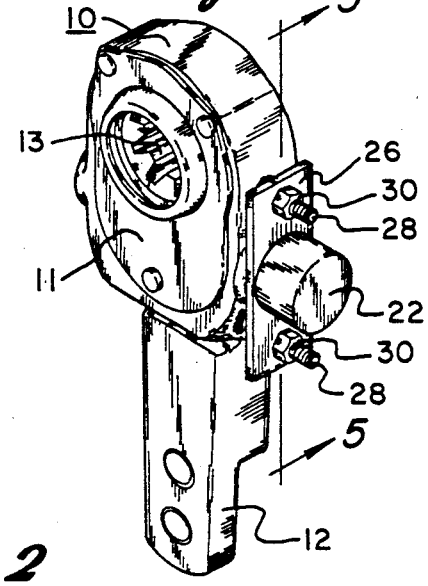
FIG. 4 is a perspective view of the conventional brake slack adjuster with the lock housing and associated attaching means of the present invention in assembled means.
Figure 2:
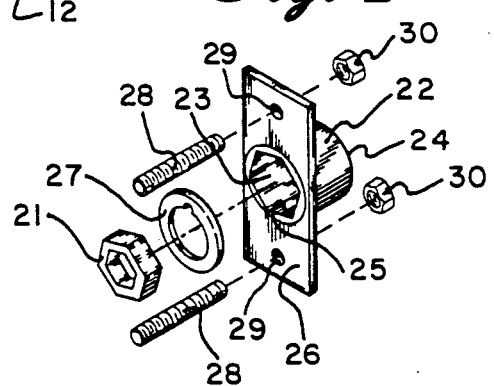
FIG. 2 is a perspective exploded view of the retrofit adjusting nut, lock housing, associated fastening means and seal forming the improvements according to the present invention.
Figure 3:
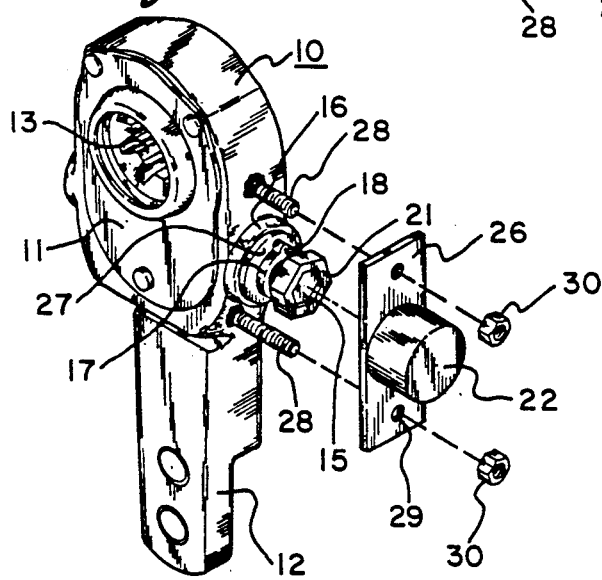
FIG. 3 is an exploded perspective view of a conventional brake slack adjuster showing the retrofit adjusting nut, lock housing socket, associated attaching means and seal prior to assembly thereof.
Figure 5:
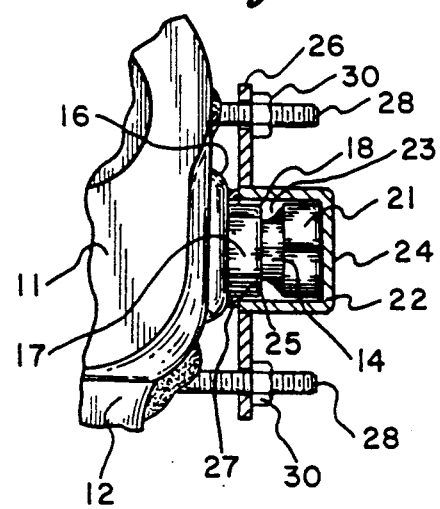
FIG. 5 is a side elevation cutaway view along lines 5—5 of FIG. 4 illustrating the retrofit adjusting nut, lock housing, associated attaching means and seal of the present invention in assembled form.

The components of the improvements of the present invention to conventional brake slack adjusting mechanisms, in accordance with the present invention, are shown in exploded perspective view in FIGS. 2 and 3 of the drawing, in assembled relationship in FIG. 4 and in cross section in FIG. 5 taken along the lines 5—5 of FIG. 4. These components include a retrofit adjusting nut 21. The retrofit adjusting nut 21, as shown in FIGS. 3 and 5, is adapted to be welded or brazed at one face thereof to the upper surface of the adjusting bolt head 15. In this manner, the worm drive adjusting bolt 14 may be rotated upon depression of the spring loaded adjusting bolt head socket lock 17 to accordingly drive the worm drive (not shown) within the adjuster housing to effect adjustment of the brakes in a conventional manner.

A lock housing 22 is provided. The lock housing 22 consists of a lock housing socket 23 which is of internal configuration to match the external configuration of the retrofit adjusting nut and thus seize or grasp the nut in locked engagement when the lock housing socket 23 is passed over the flats upon the retrofit adjusting nut 21 as shown in FIGS. 4 and 5.

The lock housing 22 is closed at its first end 24. The second end 25 of the lock housing 22 is open permitting passage of the retrofit adjusting nut 21 within the lock housing socket 23.

A flange plate 26 of approximate rectangular configuration is provided. The flange plate 26 is secured to the second end 25 of the lock housing socket by suitable means such as welding, brazing or the like.

The lock housing 22 and its associated lock housing socket 23 together with the flange plate 26 are adapted to be inserted downwardly over the retrofit adjusting nut 21 as illustrated in FIG. 5. The second end 25 of the lock housing 22 may directly engage the socket lock boss 16. However, as shown in FIG. 5, a ring like sealing member 27 may be interposed between the socket lock boss 16 and the second end 25 of the lock housing 22 to provide an atmospheric tight seal.

The lock housing 22 is maintained in place by means of two studs 28 welded to the adjuster housing 11. These studs are welded in alignment with two corresponding apertures 29 within the flange plate 26. A pair of stud lock nuts 30 are threadedly engaged with the unwelded ends of the studs 28 and appropriately tightened against the flange plate 26 to bring the lock housing 22 into secured engagement with the sealing member 27 and/or socket lock boss 16.

In use, the stud lock nuts 30 are removed and the lock housing, including the lock housing socket 23 and flange plate 26, removed from its locking engagement with the retrofit adjusting nut 21. The appropriate adjustment is then made to the braking system of the vehicle. Following adjustment, the lock housing is then reinserted over the retrofit adjusting nut 21 with the stud lock nuts 30 being threaded upon the studs 28 to secure the lock housing 22 in place. In this manner, the increased radial dimension of the retrofit adjusting nut 21 interlocked with the lock housing socket 23 provides a much stronger torque resisting lock for the adjusting mechanism. Additionally, the presence of the sealing of the lock housing 22 in conjunction with the socket lock boss 16 prevents the entrance of abrasive materials, such as dirt, sand and the like, from entering and resulting in abrading of the mechanism with its consequent ultimate failure.

The improvements to conventional brake slack adjusting mechanisms in accordance with the present invention have been described in the specification and drawing in respect to a particular embodiment thereof. Other modifications and variations upon the principle involved in the present invention are not thereby intended to be excluded by the showing of a single embodiment thereof but the scope of the invention is to be interpreted in view of the appended claims.

What is claimed is:

1. In a brake slack adjusting mechanism for heavy duty vehicles of the type having a spline drive and worm drive adjuster housing for a spline drive actuating a spline shaft to adjust the brakes and a worm drive actuating the spline drive where the worm drive is driven by a worm drive adjusting bolt terminating in an exposed adjusting bolt head and wherein the adjusting bolt head is locked against misadjustment by a spring loaded adjusting bolt head socket lock extending from a socket lock boss formed in the adjuster housing and exposed in axial alignment with the adjusting bolt head and locked within the boss of the adjuster housing against rotational movement but movable longitudinally of the adjusting bolt into locking engagement with the adjusting bolt head under spring pressure and out of locking engagement therewith when forced against the spring pressure, the improvement providing for increased adjusting bolt head locking torque while providing for environmental protection of the adjusting mechanism to prevent wear comprising:

an adjusting nut of size larger than the adjusting bolt head but smaller than the size of the socket lock boss of the adjuster housing secured to a surface of the adjusting bolt head;

a lock housing socket closed at its first end and open at its second end and of internal dimension complementary to the adjusting nut and adapted to fit thereover with the second end thereof in closing engagement with the socket lock boss of the adjuster housing, said lock housing socket preventing rotation of said adjusting nut and adjusting bolt; and lock housing socket securing means releasably securing the lock housing socket against rotational movement relative to the adjuster housing while maintaining the second end of the lock housing socket in engagement with the socket lock boss of the adjuster housing.

2. The adjusting mechanism of claim 1 wherein the lock housing socket securing means includes a flange plate secured to the second end of the lock housing socket and threaded fastening means secured to the adjuster housing and engaging the flange plate to releasably secure the flange plate in place.

3. The adjusting mechanism of claim 1 further including weather sealing means between the lock housing socket and the socket lock boss of the adjuster housing.

4. The adjusting mechanism of claim 1 further including weather sealing means between the lock housing socket and the socket lock boss of the adjuster housing.

* * * * *